United States Patent [19]

Nauman

[11] Patent Number: 5,052,704

[45] Date of Patent: Oct. 1, 1991

[54] AUXILIARY SEAT FOR BICYCLES

[75] Inventor: Leonard G. Nauman, Golden Valley, Minn.

[73] Assignee: Alan Design, Inc., Minneapolis, Minn.

[21] Appl. No.: 457,371

[22] Filed: Dec. 27, 1989

[51] Int. Cl.⁵ .............................................. B62J 1/00
[52] U.S. Cl. ................................ 280/202; 280/288.4;
     280/273; 297/214; 297/243; 224/35; 224/32 R
[58] Field of Search ..................... 280/202, 288.4, 290,
     280/304.5, 769, 273; 297/195, 214, 243, 35;
     224/32 R

[56] References Cited

U.S. PATENT DOCUMENTS

| | | | |
|---|---|---|---|
| 1,485,067 | 2/1924 | Bristol | 224/35 X |
| 4,226,347 | 10/1980 | Rice | 224/35 |
| 4,560,097 | 12/1985 | Reynolds et al. | 280/290 X |
| 4,854,607 | 8/1989 | Mandracchia et al. | 280/290 X |

FOREIGN PATENT DOCUMENTS 4388070 12/1926 Fed. Rep. of Germany ........ 224/35

Primary Examiner—Rice Kenneth R.
Assistant Examiner—Alan M. Kager
Attorney, Agent, or Firm—Moore & Hansen

[57] ABSTRACT

An auxiliary seat for bicycles of elongated, generally cylindrical shape and having a slot running lengthwise of the seat body. The slot opens at its lower end through the material of the body and has a closed upper end, within the interior of the seat body. The auxiliary seat is mounted on the horizontal bar of a bicycle by simply slipping the slot over the bar until the closed upper end of the slot is brought into firm, embracing engagement with the bicycle bar. No special tools, brackets, or hardware are required for installation or removal of the auxiliary seat. The seat is mounted on the horizontal bar of a bicycle, forwardly of the main seat for secure and safe support of a passenger, such as a child.

4 Claims, 1 Drawing Sheet

U.S. Patent
Oct. 1, 1991
5,052,704
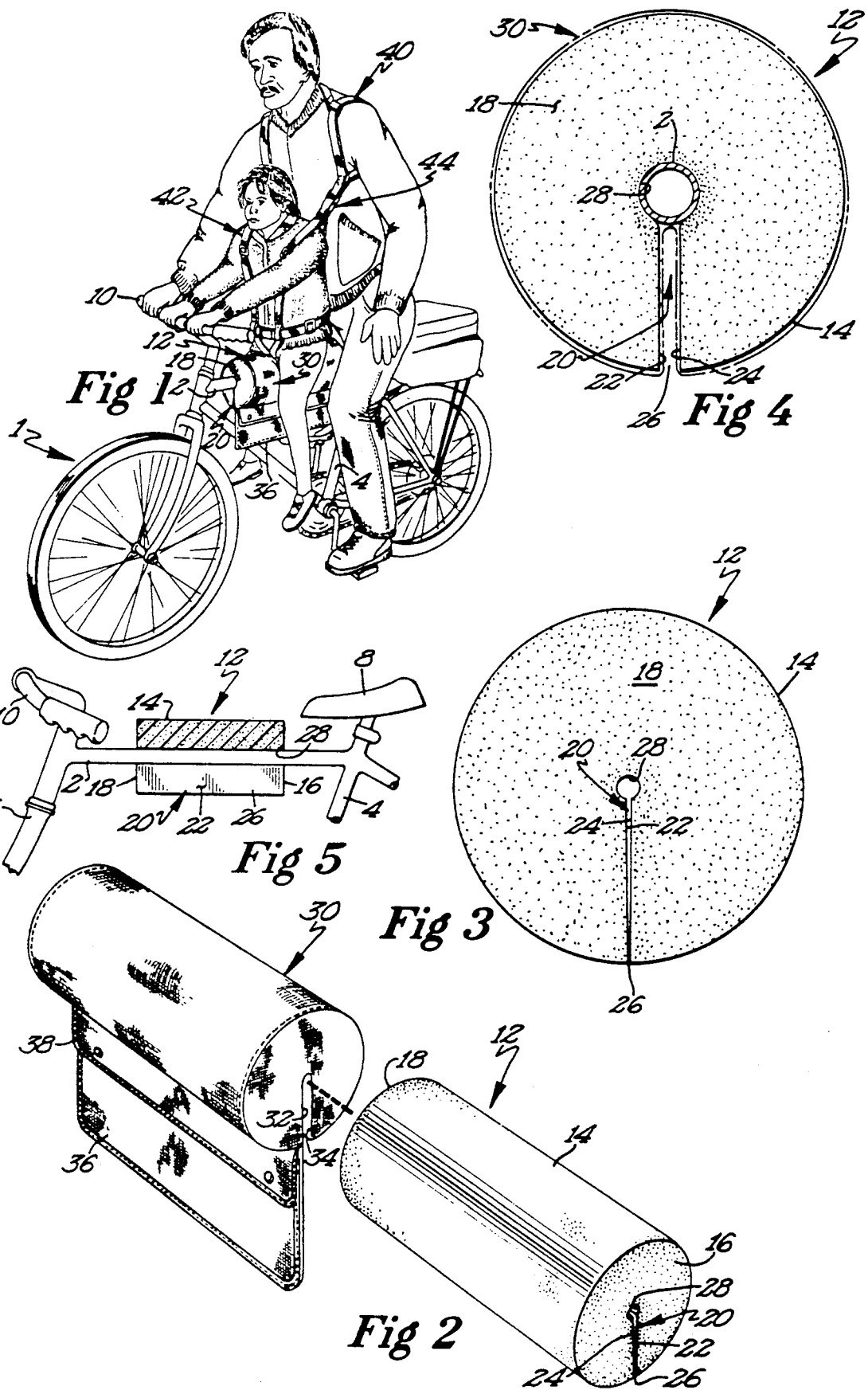

AUXILIARY SEAT FOR BICYCLES

BACKGROUND OF THE INVENTION

This invention relates to an auxiliary seat for bicycles, and particularly to such a seat for safely and comfortably supporting a child as a passenger on a bicycle ridden by an adult.

Auxiliary seats for bicycles are well known, the most common of which are those which are supported on the rear fender of the bicycle behind the main seat. Such seats have a number of disadvantages. The major problem is that the child is seated behind the adult, thus making it impossible for the adult riding on the main seat of the bicycle to maintain visual contact with the child for safety reasons. Because of the rearward disposition of such seats behind the main bicycle seat, the momentum generated when negotiating turns creates a tendency to throw the child sideways off of the rearwardly disposed seat. Also, the child's view is blocked by the adult, thus significantly detracting from the riding experience on the part of the child passenger. Such fender-mounted seats also require special hardware and fasteners by means of which they are permanently attached to the bicycle rear fender or frame.

Auxiliary seats which are mounted forwardly of the main seat on bicycles are also known. However, most of those seats are duplicates of the standard bicycle seat and are mounted by special brackets and hardware requiring the use of fasteners and tools. U.S. Pat. Nos. 2,550,200 (Murrell), 2,448,867 (Darden), 2,234,299 (Christy), and 579,514 (Collins) all are in that general category.

U.S. Pat. No. 4,305,532 issued to John F. Reminger discloses a carrier for mounting on the horizontal bar of a man's bicycle, forwardly of the main seat. The embodiment shown in FIG. 11 of the Reminger patent is mounted on the horizontal bar of the bicycle by means of two downwardly depending gripping arms; however, special, resilient tension members in the form of supporting wires are hooked to the side walls of the carrier, and are required to secure the carrier in place on the bicycle frame.

U.S. Pat. No. 4,632,453 issued to John D. Robbin et al also discloses an auxiliary seat mounted on the horizontal bar of a man's bicycle, forwardly of the main seat. However, the auxiliary seat is of the same structure and configuration as a standard bicycle seat, and is supported on a post. The post is secured to the horizontal bar of the bicycle by means of a two-piece tubular assembly which is secured around the horizontal bar by means of hose clamps.

There thus exists a need for an auxiliary seat which may be quickly and easily mounted on the horizontal bar of a bicycle, forwardly of the main seat, and which will comfortably and safely support passengers.

BRIEF SUMMARY OF THE INVENTION

The auxiliary bicycle seat of this invention is particularly characterized by a seat structure which can be quickly and easily slipped in place over the horizontal bar of a bicycle between the main seat and the handlebars, and which may be slidably adjusted along the length of that horizontal bar, without the need for any special clamps, hardware, brackets, or tools of any kind for the installation or adjustment of the auxiliary seat.

These basic objectives are realized by forming the auxiliary seat as an elongated, preferably cylindrical cushion having a slot extending lengthwise of the cushion and terminating at its lower end in a continuous opening in the bottom of the cushion which extends through the outer cushion surface. The upper end of the slot is closed and terminates within the body of the seat cushion. The cushion may thus be removably mounted on the horizontal bar of a bicycle between the main seat post and the handlebar by forcing the opening in the bottom of the slot downwardly over the horizontal bar so that the slot slides over the bar, until the closed end of the slot is brought into firm engagement with the horizontal bar. The cushion is made of material which is dense enough to support the weight of a rider, yet is sufficiently resilient that the portions of the cushion along the side walls of the slot spring inwardly towards each other to firmly embrace the bar of the bicycle after the cushion is in place.

As a particularly advantageous feature, the upper end of the aforesaid slot in the seat cushion terminates in a tubular passage which is sized and adapted to fit snugly around the horizontal bar of a bicycle. The tubular passage is preferably of a lesser diameter than the horizontal bicycle bar which it embraces, as a result of which the resilient walls of the tubular passage within the body of the cushion squeeze tightly around the horizontal bar and firmly embrace it so as to hold the auxiliary seat cushion in place.

A further beneficial aspect of the auxiliary seat resides in its uniform, cylindrical shape. With such a shape, a person seated on the cushion will be comfortably supported at any position along the length of the seat cushion, and will not suffer any discomfort if the cushion should rotate slightly on the horizontal bar of the bicycle. Various materials may be utilized to make the auxiliary seat of such a cylindrical shape. Polyurethane foam has been found to be particularly desirable.

These and other objects and advantages of the invention will become readily apparent as the following description is read in conjunction with the accompanying drawings wherein like reference numerals have been used to designate like elements throughout the several views.

BRIEF DESCRIPTION OF THE DRAWINGS

FIG. 1 is a perspective view showing a bicycle with the improved auxiliary seat mounted on it;

FIG. 2 is a perspective view of the auxiliary seat showing the seat cover removed, in exploded relation to the seat cushion;

FIG. 3 is an end view of the auxiliary seat in its normal position of nonuse;

FIG. 4 is a front end view of the seat in the condition it assumes when mounted on the horizontal bar of a bicycle, with the bar being shown in vertical section; and FIG. 5 is a side elevation view of a bicycle showing the auxiliary seat mounted thereon, in vertical section.

DESCRIPTION OF THE PREFERRED EMBODIMENT

With reference to the drawings, FIG. 1 generally indicates a bicycle of standard construction on which the auxiliary seat is adapted to be mounted. Such a bicycle is of the man's type having a horizontal bar 2 extending between an upright seat post 4 and a forwardly located handlebar support post 6. Although reference is made to a man's bicycle, it is anticipated that a woman's bicycle could be adapted for use of the auxiliary seat disclosed herein, by the mounting of a special, removable horizontal bar between the rear seat post 4 and the handlebar post 6. A main seat 8 is mounted on top of the upright seat post 4, and a handlebar assembly 10 is supported on post 6.

The auxiliary seat is generally indicated by reference numeral 12. The seat is preferably formed in the shape of an elongated, cylindrical body 14 made of material having sufficient density to support the weight of a person. Although various materials may be utilized for forming such a seat, polyurethane foam of at least medium density has been found to be particularly suitable. The cylindrical seat body 14 has opposed end walls 16 and 18.

Extending lengthwise over the entire length of the seat body 14 is an elongated slot 20 defined by opposed side walls 22 and 24. Slot 20 terminates at its lower end in a continuous opening 26 extending through the outer surface of cylindrical body 14. At its upper end, slot 20 is closed, and preferably terminates in a tubular passage 28 as shown most clearly in FIGS. 3 and 4.

As may be noted by reference to all of the figures of the drawings, slot 20 extends substantially vertically when the seat cushion is oriented horizontally for mounting o the horizontal bar of a bicycle, with tubular passage 28 being located substantially along the longitudinal central axis of the seat cushion body 14. Thus, slot 20 extends vertically between continuous opening 26 at the bottom thereof and tubular passage 28 at the upper end of slot 20. Elongated passage 28 is advantageously sized so that it will be of a lesser diameter than the horizontal bar to be found on most men's bicycles. As a result, tubular passage 28 will be stretched radially so as to compress the material of seat body 14 surrounding it, when slot 20 is forced downwardly over the bicycle horizontal bar 2. Thus, after installation on the horizontal bar 2 of the bicycle to the position shown in FIGS. 1, 4, and 5, the resilient material of seat body 14 will spring back inwardly around horizontal bar 2 in secure, embracing engagement therewith. In this way, the auxiliary seat 12 is firmly held in place on the horizontal bar of the bicycle without the need of any special mounting hardware or brackets or special fasteners.

It will thus be seen that auxiliary seat 12 can be quickly and easily mounted on the horizontal bar of a bicycle, forwardly of the main seat by simply positioning seat body 14 on top of the bar with continuous opening 26 of slot 20 aligned longitudinally with the bar. Downward force applied to the seat body 14 will force slot 20 downwardly over the bar 2. As this happens, the side walls 22 and 24 of slot 20 will be spread apart to the position shown in FIG. 4. Side walls 22 and 24 are normally positioned closely adjacent to each other, and preferably slightly tapered upwardly and outwardly as shown in FIG. 3. After slot 20 is pushed downwardly over its full extent so as to bring elongated passage 28 against and around the horizontal bicycle bar 2, side walls 22 and 24 of slot 20 will remain in an outwardly spread condition as shown in FIG. 4. However, the gap between side walls 22 and 24 as shown in FIG. 4 will be less than the width or diameter of the bicycle bar 2. As a result, side walls 22 and 24 will be urged inwardly towards each other, as will the material of cushion body 14 defining tubular passage 28. This provides a tight fit of tubular passage 28 around bar 2, which serves to securely hold the auxiliary seat 12 in place.

After removable mounting on the horizontal bar 2 of a bicycle as shown in FIGS. 1 and 5, the auxiliary seat 12 may be readily adjusted along the length of bar 2 by simply sliding it back and forth. Tubular passage 28 facilitates such slidable adjustment. The location of seat 12 on bar 2 may be longitudinally adjusted in such a manner so that the person seated thereon may comfortably grasp the handlebars 10 to hold himself on the bicycle. Also, the uniform, cylindrical shape of seat body 14 permits the passenger to rest comfortably on the auxiliary seat at any location along its length; and even if the seat body 14 should rotate slightly around bicycle bar 2, the uniform geometry of seat body 14 will present a comfortable surface to the passenger.

Although not essential, a cover generally indicated by reference numeral 30 and shown most clearly in FIG. 2 may be provided around seat body 14. Cover 30 may be made of nylon, or of any other suitable, durable material. Cover 30 is preferably made so that it totally covers all of the outer surface of seat body 1, including end walls 16 and 18. Preferably, cover 30 is formed with vertically extending, slot segments 32 and 34 folded upwardly in the center thereof so as to conform to and overlie side walls 22 and 24 of slot 20 in seat body 14. In this way, cover side walls 32 and 34 serve to protect the portions of seat body 14 defining slot side walls 22 and 24 so as to avoid excessive wear on the slot portions of seat body 14 in the course of frequent mounting on and removal from a bicycle bar. FIG. 4 shows cover 30 in phantom as it would be positioned in embracing relation to seat body 14, and extending within slot 20.

Cover 30 may also be formed to include a downwardly depending pocket 36 having a closure flap 38 snapped in place thereon. This permits the carrying of articles on seat cover 30. Although shown depending downwardly directly under slot opening 26, pocket 36 could be formed integrally with cover 30 at any point along the length thereof, around its periphery.

Optionally, a restraining and safety belt system may be utilized by the adult rider and the passenger, particularly in the case of a child passenger to assist in securely holding the passenger on the auxiliary seat 12. Thus, as shown in FIG. 1, the adult rider seated on the main seat 8 may wear a harness type of belt unit 40, and a special harness 42 may be worn by the child. Harnesses 40 and 42 are provided with complementary, mating coupling members whereby they ma be quickly and easily secured to each other as indicated at 44 in FIG. 1. In this way, the adult rider supports and secures the child riding in front of him by way of the interlocking harnesses.

The particular benefits to be derived from the auxiliary seat disclosed herein are readily apparent. The child is seated in front of the adult where he has full visibility, and where the adult can at all times have full visual contact with the child passenger. The adult and the child are comfortably positioned closely adjacent to each other so that they may converse and enjoy a bicycle ride together. The child may adjust himself along the length of removable auxiliary seat 12 so that he may comfortably grasp the handlebars 10, as shown in FIG. 1. The child may also slidably adjust seat 12 along the length of horizontal bicycle bar 2, as may be necessary and appropriate. Auxiliary seat 12 is compact and of light weight, and may be readily slipped onto and off of bicycle bar 2 by way of slot 20 in seat body 14. No special tools are required for that purpose.

It is anticipated that various changes may be made in the size, shape, and construction of the auxiliary bicycle seat disclosed herein without departing from the spirit and scope of the invention as defined by the following claims.

What is claimed is:

1. An auxiliary seat for attachment to the horizontal bar of a bicycle frame, forwardly of the main passenger seat, comprising:

an elongated seat cushion formed from material of sufficiently high density to support the weight of a person;

an elongated slot extending over the entire length of said seat cushion and terminating at its lower end in a continuous opening in the bottom of said seat cushion extending through the outer surface thereof, said slot further extending substantially vertically when said seat cushion is oriented generally horizontally for mounting on a horizontal bar of a bicycle, and the upper end of said slot being closed and terminating within the body of said seat cushion in a tubular passage sized and adapted to fit snugly around the aforesaid horizontal bar of a bicycle, said cushion having sufficient resiliency that the material of said cushion defining said tubular passage will spring back around the horizontal bar in secure, embracing engagement therewith after said slot is forced over the bar, said tubular passage being located substantially at the longitudinal central axis of said seat cushion, a protective and decorative cover wrapped around the outside of said seat cushion and extending into and covering the portions of said seat cushion defining said slot so as to protect said portions of said cushion from wear in the course of sliding said slot onto and off of a horizontal bar of a bicycle for installation and removal of said seat cushion, whereby said seat cushion may be removably mounted on the horizontal bar extending between the main seat post and the handle bar post of a bicycle, at a location forwardly of the main seat on said seat post, by placing said continuous opening against the top of said horizontal bar and forcing the seat cushion downwardly so that said slot slides over said horizontal bar, until said closed end of said slot is brought into firm engagement with said horizontal bar.

2. An auxiliary seat for bicycles as defined in claim 1 wherein:

said cover has a pocket formed integrally therewith, said pocket depending downwardly from said seat cushion when said seat cushion is installed in its normal position of use.

3. An auxiliary seat for bicycles as defined in claim 1 wherein:

said cover is made of nylon.

4. An auxiliary seat for bicycles as defined in claim 1 wherein:

said elongated slot comprises a pair of mutually opposed side walls, said side walls being tapered upwardly and outwardly such that said walls are farther apart at said closed end than at said continuous opening, said tapered side walls facilitating the embracing engagement of said elongated slot with the horizontal bar in the area of said tubular passage.

* * * * *